United States Patent [19]

Coxon et al.

[11] 4,203,424
[45] May 20, 1980

[54] SOLAR HEAT AIR SYSTEM

[75] Inventors: DeWayne Coxon; Timothy P. Gates, both of Cedar Springs, Mich.

[73] Assignee: Jordan College, Cedar Springs, Mich.

[21] Appl. No.: 866,546

[22] Filed: Jan. 3, 1978

[51] Int. Cl.² .................................................. F24J 3/02
[52] U.S. Cl. .................................... 126/422; 126/429; 126/430
[58] Field of Search .............. 126/270, 271, 400, 452, 126/436, 422, 428, 429, 430; 237/1 A; 236/11

[56] References Cited

U.S. PATENT DOCUMENTS

| | | | |
|---|---|---|---|
| 3,489,345 | 1/1970 | Moreland | 236/11 X |
| 3,997,108 | 12/1976 | Mason | 126/270 X |
| 4,012,920 | 3/1977 | Kirschbaum | 126/400 X |
| 4,029,081 | 6/1977 | Strong | 126/270 |
| 4,051,999 | 10/1977 | Granger et al. | 126/400 X |
| 4,060,195 | 11/1977 | Rapp, Jr. et al. | 126/270 X |
| 4,061,267 | 12/1977 | Lof | 126/270 X |
| 4,069,971 | 1/1978 | Swanson | 126/400 X |
| 4,081,024 | 3/1978 | Rush et al. | 126/270 X |
| 4,095,584 | 6/1978 | Pies | 237/1 A X |
| 4,124,061 | 11/1978 | Mitchell et al. | 126/400 X |
| 4,129,116 | 12/1978 | Kent | 126/270 |

Primary Examiner—Carroll B. Dority, Jr.
Assistant Examiner—Randall L. Green
Attorney, Agent, or Firm—Price, Heneveld, Huizenga & Cooper

[57] ABSTRACT

There is disclosed herein a forced air solar heating system which causes selectively operated multiple air blowers in combination with multiple ducts and control dampers to operate in response to heat sensors in the space to be heated, and in a solar collector, and in a storage chamber, to transfer heat from the collector to storage, or to controllably transfer heat to said space from the collector or from the storage, but also alternatively as mixed heated air from both the collector and the storage, to a mixing chamber and then to said space. The air propelling blowers, the flow control dampers, and the mixing chamber are preferably all part of a unitary air handler.

5 Claims, 11 Drawing Figures

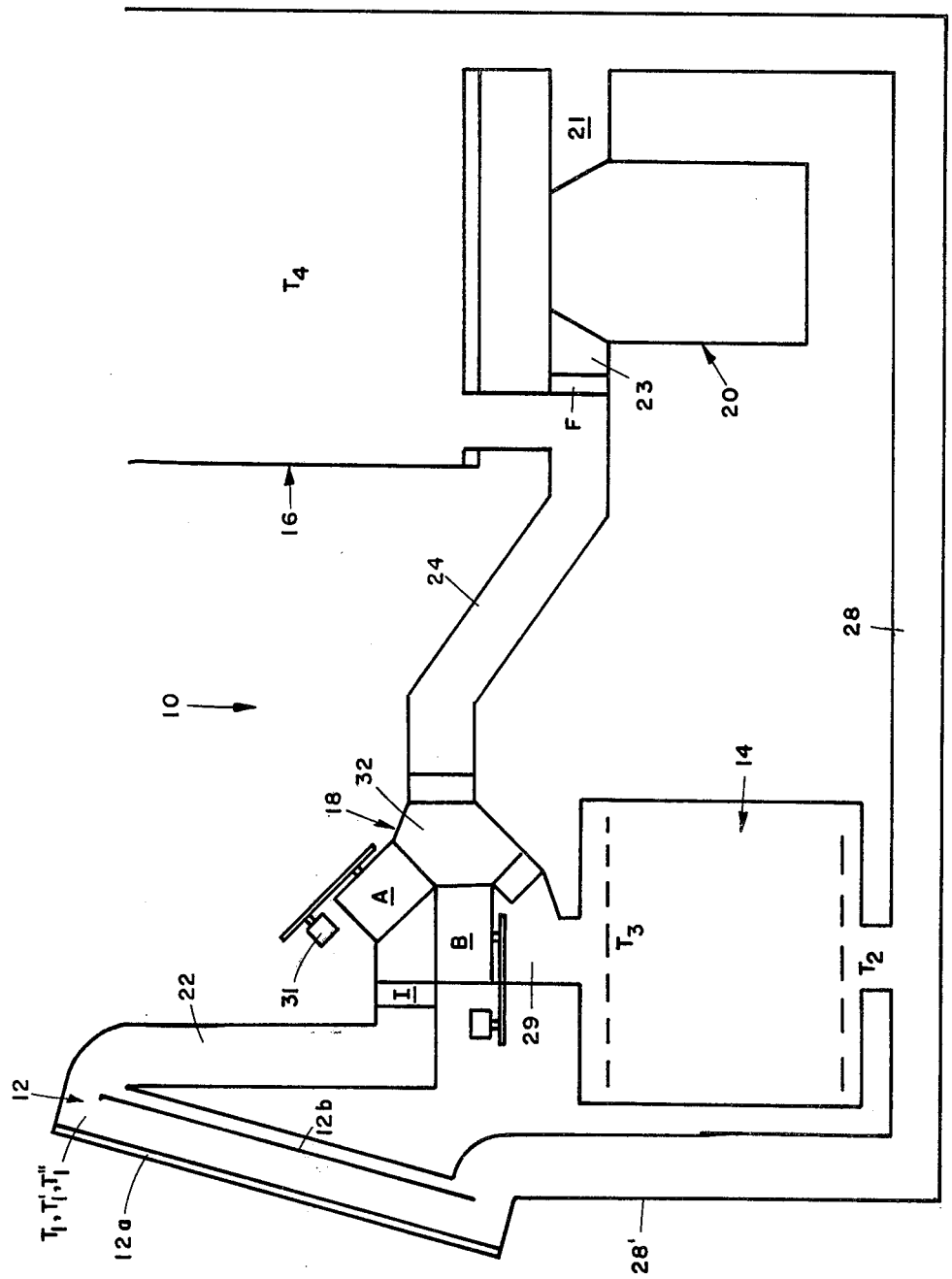

SOLAR HEAT AIR SYSTEM

BACKGROUND OF THE INVENTION

This invention relates to solar energy heating systems.

Significant technological progress has been made in solar heating systems in recent years, following the realization of limits on fossil fuels and the rapidly increasing cost thereof. Solar heating is becoming a practical reality in some geographical areas, particularly in the southern and southwestern parts of the United States, sometimes designated the "Sun Belt". In the more northern regions, as in the northwestern, midwestern, and northeastern parts of the United States, where the number of sunny days is less, there is difficulty justifying the installation cost of solar equipment because of the considerably lower efficiency thereof. There are many cloudy or partly cloudy days when the collector cannot generate sufficient heat to meet requirements, particularly during cool mornings and evenings. Hence, any solar system of the presently known type is typically inactivated at such times, with the heat then being generated by fossil fuel combustion. Unfortunately, these same regions of cooler climate are more in need of whatever solar energy there is available, even if insufficient to meet the total heat requirements.

SUMMARY OF THE INVENTION

This invention provides a solar heating system particularly suited for use in the cooler, less sunny, northern climates, by enabling efficient usage of whatever heat there is available from the solar collector and in the storage unit, even when the solar collector is not generating adequate heat to supply the requirements for the space being heated. A unique air flow system is capable of selectively retrieving heat simultaneously from both the solar collector and the heat storage, mixing the two fluids and subsequently propelling the mixture to the space to be heated.

The novel air handler and mixer enables the lesser amount of heat which the solar collector is able to generate to be salvaged and combined with previously stored heat for maximizing the output. Yet, the additional apparatus required to achieve this, over that solar equipment which is conventionally employed, is relatively small, and relatively inexpensive, with installation thereof being readily made.

BRIEF DESCRIPTION OF THE DRAWINGS

FIG. 6 is a schematic diagram of the system at rest.

DESCRIPTION OF THE PREFERRED EMBODIMENT

Figure 1A:
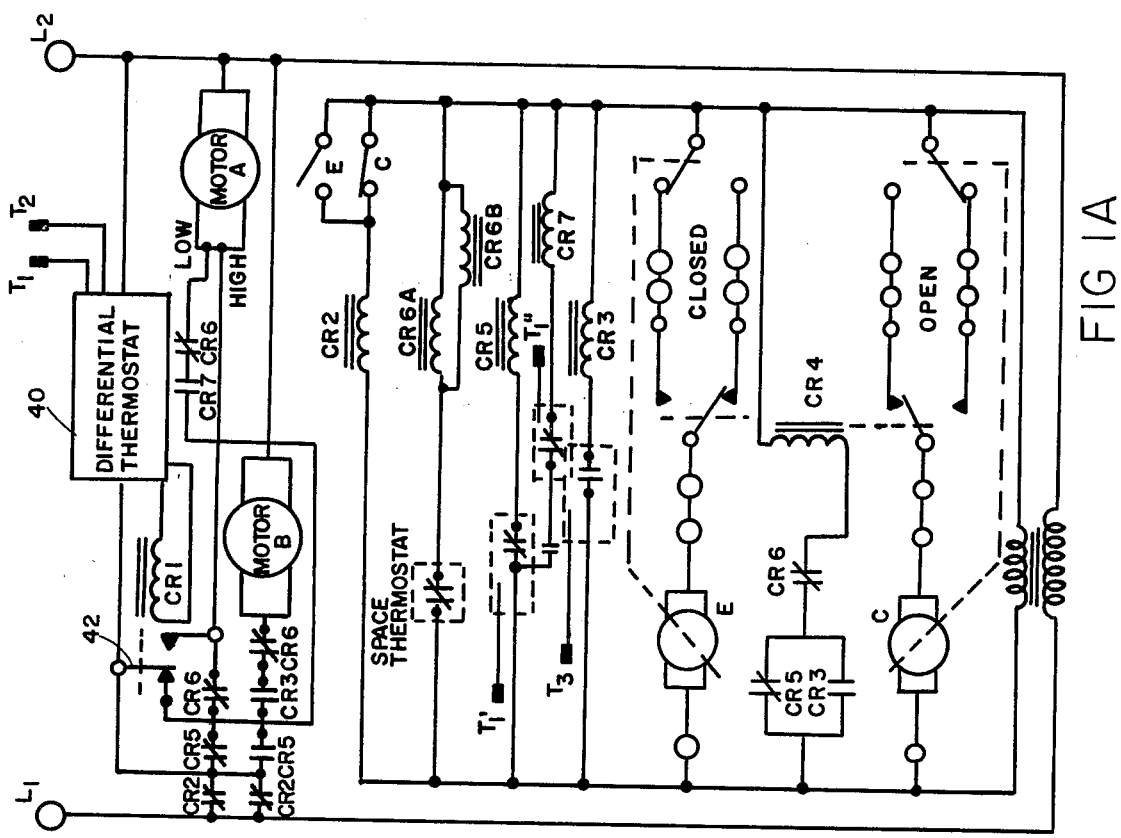
FIG. 1a is an electrical diagram of the control system for mode 1.

Referring now specifically to the drawings, in FIG. 6 is disclosed a schematic of the components of this system. Specifically, the system or assembly 10 includes a solar collector 12, a heat storage unit 14, an enclosure for the space or protected environment 16 to be heated, a unique air flow handling and mixing assembly 18, preferably an auxiliary heating unit 20, and interconnecting ducts, namely duct 22 from collector 12 to assembly 18, duct 24 between assembly 18 and space 16, duct 28 between space 16 and storage 14 also having a portion 28' extending from storage 14 to collector 12, and duct 29 between assembly 18 and storage unit 14.

The particular construction of the solar heat collector 12 can vary widely, there being many known in the art. Basically, the collector is positioned at a selected angle to the vertical to maximize absorption of solar radiation for conversion to thermal energy. It is constructed to allow air flow through channels in engagement with the heat absorbing surfaces, usually black, e.g. 12a and 12b, from an inlet typically at the lower end of the collector, to an outlet at the upper end thereof.

The storage unit 14 likewise can vary in nature and specifics, there being several conventional designs which can be employed. A typical storage unit, for example, would be a three dimensional enclosure containing "heat sink" material such as rocks or the equivalent which are spaced to allow air flow therethrough for absorption of heat from heated air to the rocks, or subsequent discharge of stored heat from the rocks to cooler air flowing therethrough.

The environmental space to be heated will vary with the circumstances, typical examples being a home, an office space, a work space, or any other environmental area encountered in normal living patterns.

Auxiliary heater 20 may assume a variety of forms, typically being a fossil burning unit such as a gas, oil, or coal burning furnace, but may alternatively be another source of heat such as an electrical energy heat exchanger or a heat pump.

The ducts 22, 24, 26, 28, 28' and 29 are formed in the shape and dimension necessary to conduct air in the several recirculatory paths set forth for the different operating modes of this system to be described.

The mixing assembly 18 includes a first, powered, air propulsion means or two-speed blower A having its inlet communicant with duct 22 and its outlet communicant with a special air mixing or blending chamber 32. A damper I in duct 22 adjacent the inlet to blower A is pressure responsive, allowing flow from the duct to the blower, but preventing reverse flow by being responsive to positive pressure at the blower. Assembly 18 also includes a second air propulsion means or blower B having an inlet communicant with duct 22, an inlet communicant with duct 29 and an outlet communicant with mixing chamber 32. Duct 29 is communicant with storage unit 14, as well as with the inlet of blower B or alternately with mixing chamber 32. A motor operated damper C is between duct 29 and mixing chamber 32 to allow, when open, air flow from mixing chamber 32 to duct 29 and hence to storage unit 14. A back pressure responsive, normally closed damper F is at outlet duct 23 of auxiliary heat source 20. Inlet 21 communicates with duct 28 and outlet 23 with duct 24.

With this novel system, particularly using the novel assembly 18, solar engery can more effectively be employed in geographical areas where sunlight is not as plentiful as in other areas, e.g. there being shorter days during cold weather, the sun being partially blocked by clouds so as to lessen the amount of solar radiation usable, and there being cooler mornings and evenings when the solar collector cannot always generate sufficient heat to accommodate the space to be heated. Thus, with the novel assembly, not only can air be heated and circulated directly between the solar collector 12 and the space 16 (mode 1, FIG. 1), or circulated directly between the solar collector 12 and the storage unit 14, (FIG. 4, mode 4), or circulated between storage unit 14 and the environmental space 16 (FIG. 3, mode 3), but also, especially in the morning or evening when there is some sunlight available or during an overcast day when there is partial solar radiation available but not in sufficient amount to totally accommodate the environmental space requirements, a blend of some air partially heated by passage through storage unit 14 with other air partially heated by passage through solar collector 12 is prepared in the mixing chamber 32 by the two blowers and circulated to the environmental space (FIG. 2, mode 2). This controlled operation of the two separately activated blowers plus controlled activation of the dampers combines air from the two different heat sources in the mixing chamber and propels such to the environmental space. The air propulsion unit A for handling air from the solar collector has different air output capacities and settings so that in mixing mode 2, its output is substantially lessened from that in modes 1 and 4, preferably to about one-half. This can be achieved by having, for example, a two speed motor 31 operating this blower A, with one set of windings for high motor speed and greater air output and another set of windings for low motor speed and lesser air output. The low speed is used when the combined output from blowers A and B is mixed and circulate.

The blowers, motor operated dampers, and auxiliary heating unit are operated in response to temperature sensors or thermostats at strategic locations in the system. In the embodiment depicted, there are four basic locations for such sensors. One location is in the environmental space to be heated where space thermostat sensor T4 is located. Another location is at the lowest energy (i.e. lowest temperature) point of the storage unit, in this case the opening 15 at the bottom where thermostat sensor T2 is located. Another location is at the highest energy, (i.e. highest temparature) point of the storage chamber, in this case at the opening adjacent duct 29, where thermostat sensor T3 is located. The fourth location is at the highest energy, (i.e. highest temperature) point in the solar collector, in this case near the top outlet where thermostat sensors T1, T1', and T1" are located. Sensor T1 is part of a differential thermostat in combination with sensor T2. It operates relay CR1 which shifts switch 42 between two positions to complete a circuit for low speed blower windings or a circuit for high speed blower windings for motor A of blower A. Differential thermostates are conventional items marketed for example under the trademarks "Honeywell" and "Rho Sigma", the operation of which is explained hereinafter.

In FIGS. 1a, 2a, 3a, 4a and 5a is set forth an electrical diagram depicting a control circuit, each figure showing the control circuit in a different mode of operation. The circuit is powered from bus lines L1 and L2 and includes relays CR1, CR2, CR3, CR4, CR5, CR6, CR6a, CR6b and CR7 as well as temperature sensors T1, T1', T1", T2, T3 and T4. It includes an electrical motor A for blower A and an electrical motor B for blower B, a motor operated damper C and a motor operated damper E. A differential thermostat 40 employs temperature sensor T1 in the solar collector and temperature sensor T2 in the low energy part of the storage unit. The sensor T1 is adjusted to activate at a temperature of above about 140° F., while sensor T2 is adjusted to activate at a temperature of above about 80° F. and below 140° F. A thermostat T4 in the enviromental space to be heated, when closed, operates the coils for relays CR6A and CR6B. Thermostat T1 controls the relay CR5 and thermostat T1" controls relay CR7. Thermostat T3 controls relay CR3.

In operation, in mode 1, the environmental space is heated by the solar collector. Specifically, when the space calls for heat by closing of the space thermostat contacts, relays CR6A and CR6B are energized. In this mode, blower A is energized by either (1) the differential thermostat or (2) by relay CR2 (which is closed when damper E is open) plus relay CR5 which is activated when temperature sensor T1' indicates solar heat availability in the collector, plus relay CR6 closed by the space thermostat T4. When sensor T1 energizes relay CR5, and relay CR6 is energized, such energizes relay CR4, which in turn operates motorized dampers C and E. These dampers are always in opposite positions relative to each other. In this mode 1, damper E opens and damper C closes. Positive back pressure against damper F keeps it closed to maintain isolation of the auxiliary unit. Back pressure responsive damper I is held open by air flow pressure differential thereacross.

Figure 1:
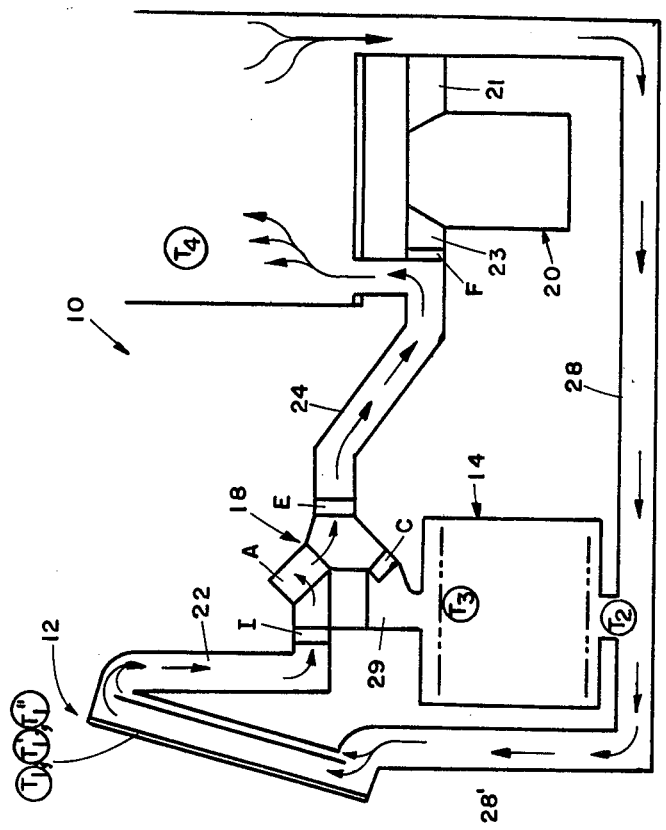
FIG. 1 is a schematic view of the heating and air flow system of this invention, depicted in mode 1, that is, in the mode of heating the controlled environment or space directly from the solar collector.

In this condition, mode 1, the system operates as indicated by the arrows in FIG. 1, i.e. heated air in the solar collector is advanced through duct 22 and through open damper I by blower A operated by its motor 31, into chamber 32 and through damper E into duct 24 to the space to be heated, the return air being drawn through duct 28 and 28' to the collector.

Mode 2 is the special mixing mode which is described hereinafter.

Figure 3A:
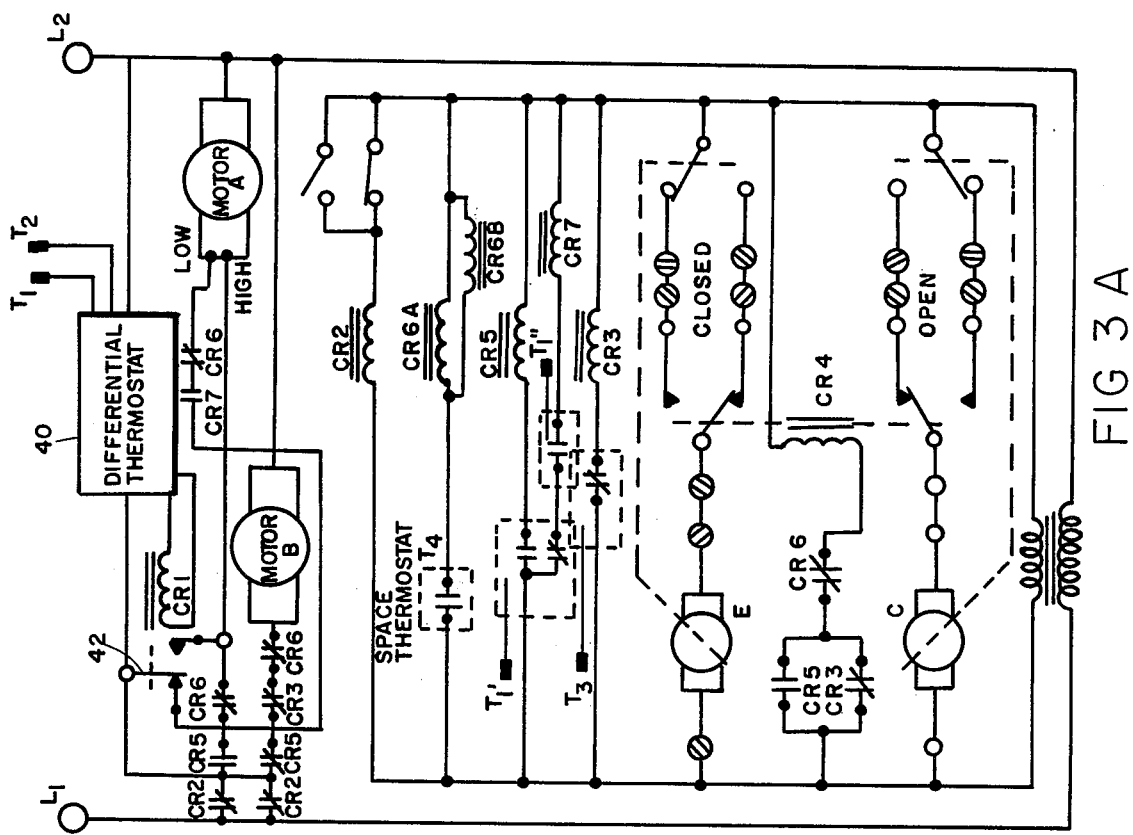
FIG. 3a is an electrical diagram of the control system for mode 3.
Figure 3:
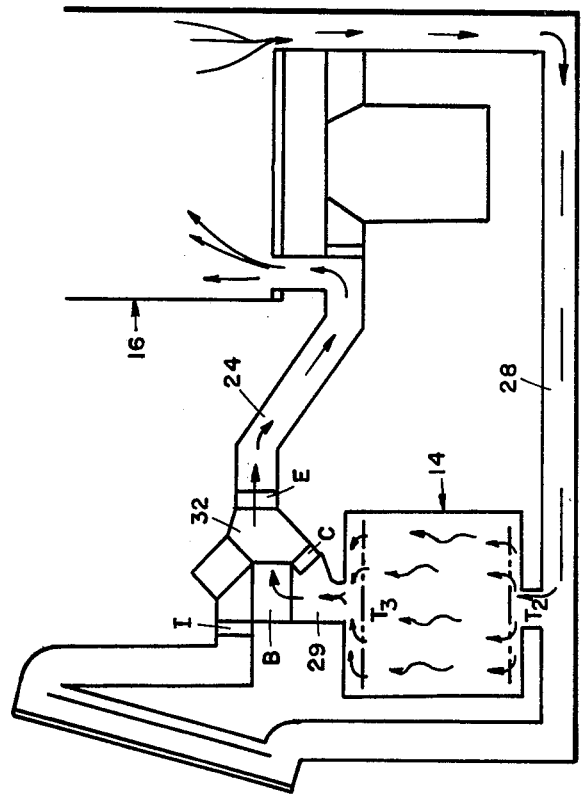
FIG. 3 is a schematic diagram of the system in mode 3, with heated air flow from only storage to the space.

In mode 3, see FIG. 3 and FIG. 3a, heat is obtained from the storage unit and circulated to the space and returned. Specifically, the temperature in the solar collector is not sufficient, as detected by sensor T1', to activate relay CR5. Sensor T3 in the high temperature end of the storage unit however, energizes relay CR3 such that, with relay CR2 being activated by one the dampers E and C being open, and with relays CR6A and CR6B being activated by the space thermostat, blower B is energized. The activation of relays CR3 and CR6 also energizes relay CR4, opening motorized damper E and closing damper C. The pressure differential holds damper I closed. It acts as a check valve to prevent air flow back through the collector. Blower A cannot be energized in this mode 3 because, for sensor T3 to be satisfied and not temperature sensor T1, the temperature at sensor T1 must equal or be less than the temperature at sensor T2 which excludes relay CR1, relay CR5, and relay CR7, to prevent air flow through the other paths. Thus, the air is recirculated by blower B drawing air from storage unit 14 through duct 29, through blower B into mixing chamber 32, through open damper E into duct 24 to the space at 16, being returned through the return duct 28 to the storage inlet 15. Heat is thus drawn from the storage unit and transferred via heated air to the environmental space.

Figure 2A:
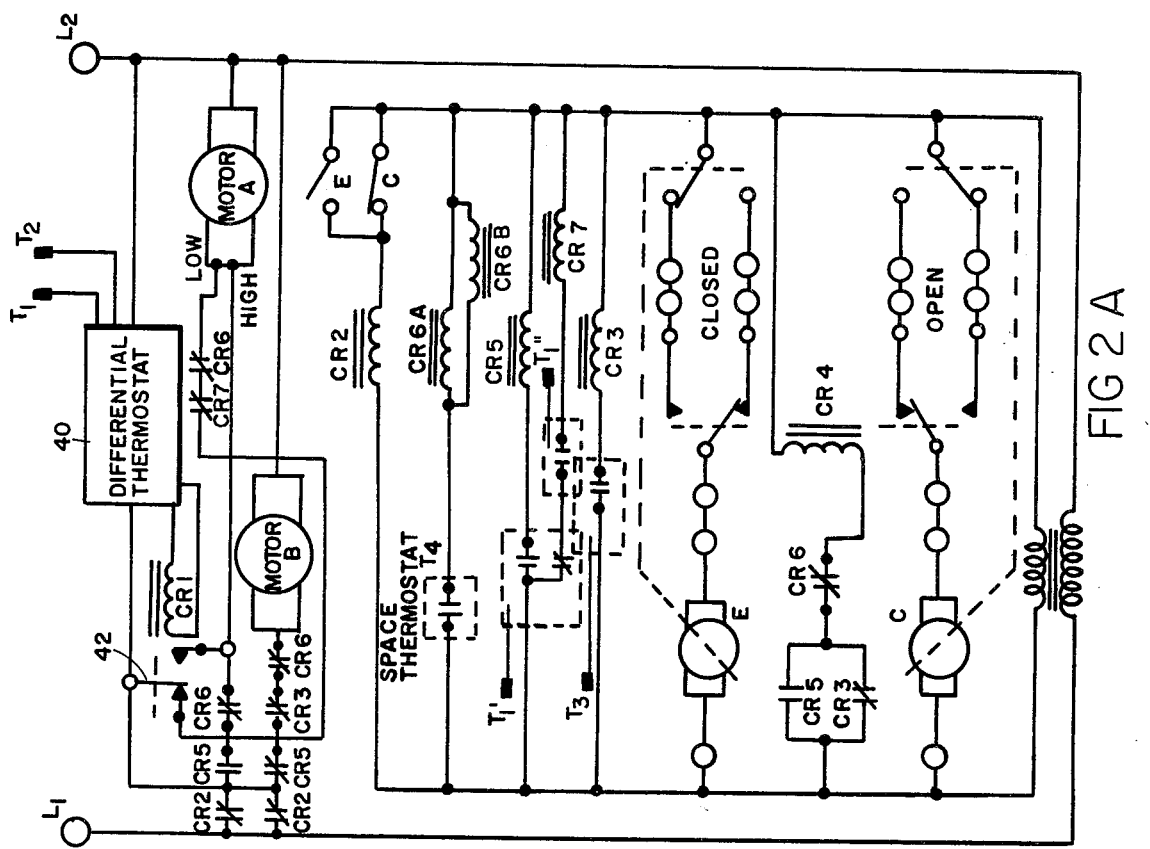
FIG 2a is an electrical diagram of the control system for mode 2.
Figure 2:
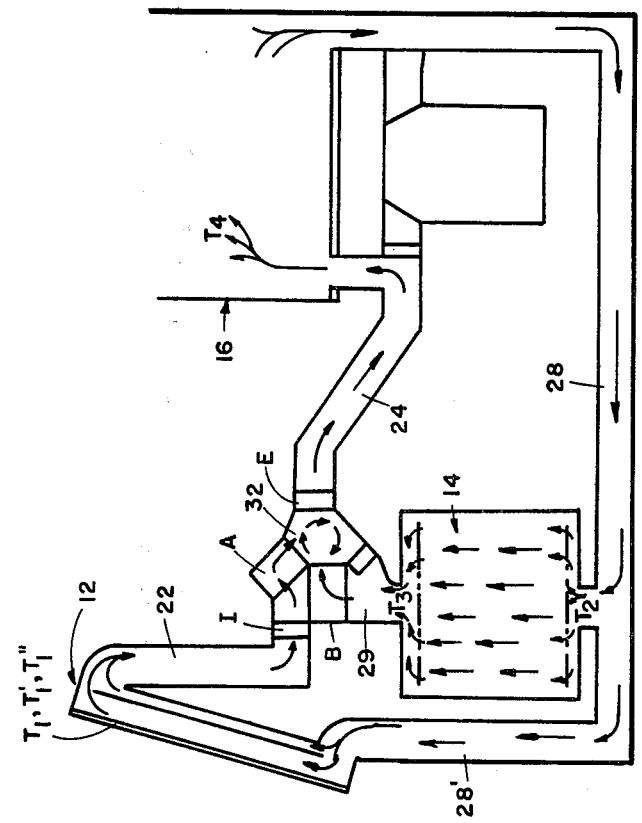
FIG. 2 is a schematic diagram of the novel system in mode 2, with the space being specially heated by a portion of the air being circulated through the solar collector and a portion through the heat storage, with subsequent mixing of these air portions.

In the special mixing mode 2, see FIG. 2 and FIG. 2a, the temperature of the solar collector 12 is sufficient to activate sensor T1 i.e. above about 80° F., although not sufficient to supply all of the heat requirements to the environmental space i.e. below about 140° F. This preset temperature value of about 80° F. can be varied, although a solar collector temperature of 80° F. is sufficiently above a comfort temperature range of 65°–75° F. to supply some energy to the space to be heated. The preset temperature value of about 140° F. will be varied to suit the size of the space to be heated, the size of the collector unit or units, heat losses in the ducts, air blower capacity and the like. The specific setting is chosen to be that at which the energy level in the collector is sufficient to heat the space without added supplemental energy. The T1 activation temperature, e.g. 80° F., is the minimum temperature to activate the system for air mixing operation according to mode 2. The blower A is then on low speed. The T2 activation temperature, e.g. 140° F., is the minimum temperature to activate the system for mode 1 operation wherein the collector supplies all of the required heat.

Thus, in mode 2, the air flow path described above relative to mode 3 is active and in addition, since the temperature of the solar collector is above the minimum mixing temperature but not above the minimum temperature for supplying all of the heat requirements for the space, and with the space calling for heat thereby having its thermostat activating relays CR6A and CR6B, blower A is energized at low speed by differential thermostat 40 causing relay CR1 to shift switch 42 for the low speed windings of the motor for blower A. With blower A energized at low speed, and blower B also being energized as explained previously, relative to mode 3, some air is drawn from the collector 12 through duct 22 and through damper I and through blower A operating at low speed into mixing chamber 32, while simultaneously, heated air is drawn from the storage unit 14 through duct 29 and blower B into mixing chamber 32, where both portions of air are mixed and blended before being propelled through damper E and duct 24 to the space within enclosure 16. The return air through duct 28 from the space is partially transferred into storage chamber 14 at 15 and partially conveyed through branch duct 28' to collector 12, for recirculation. Thus, any heat that is available in the collector 12 is salvaged, while supplemental heat is drawn from storage unit 14, by the cooperative action of the two blowers and the mixing chamber in the system.

Figure 4A:
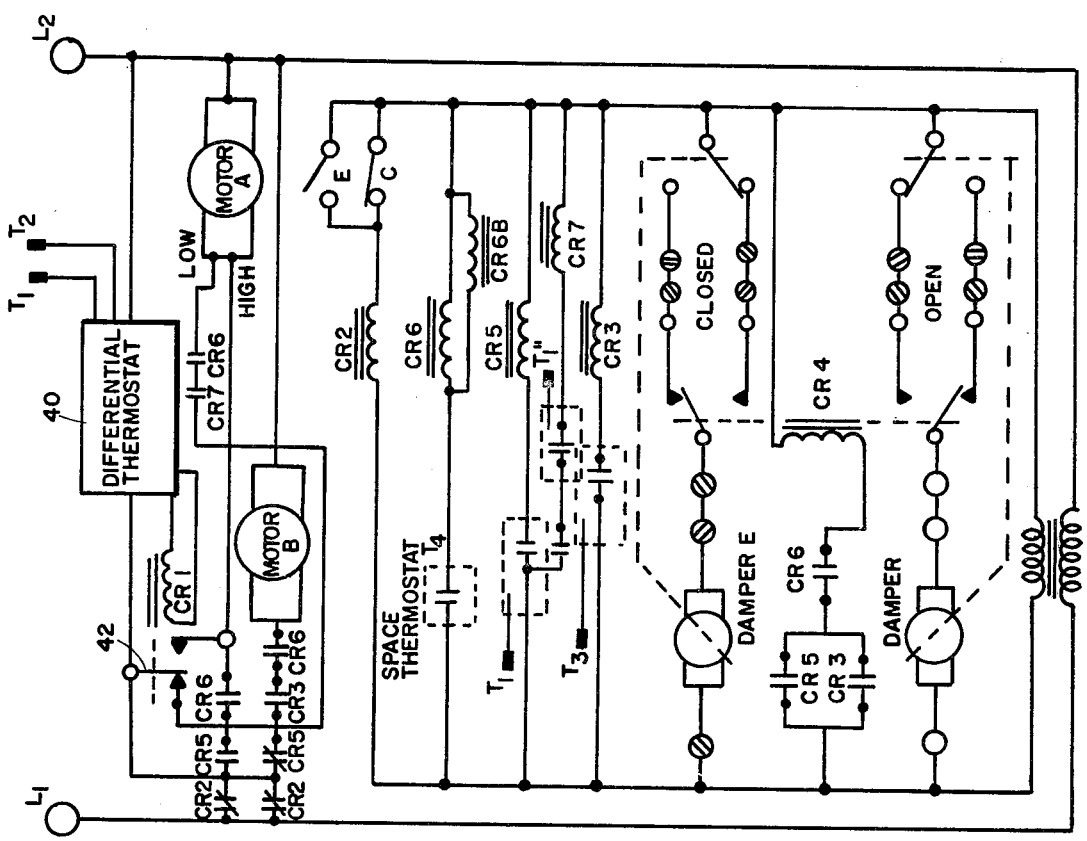
FIG. 4a is an electrical diagram of the control system for mode 4.
Figure 4:
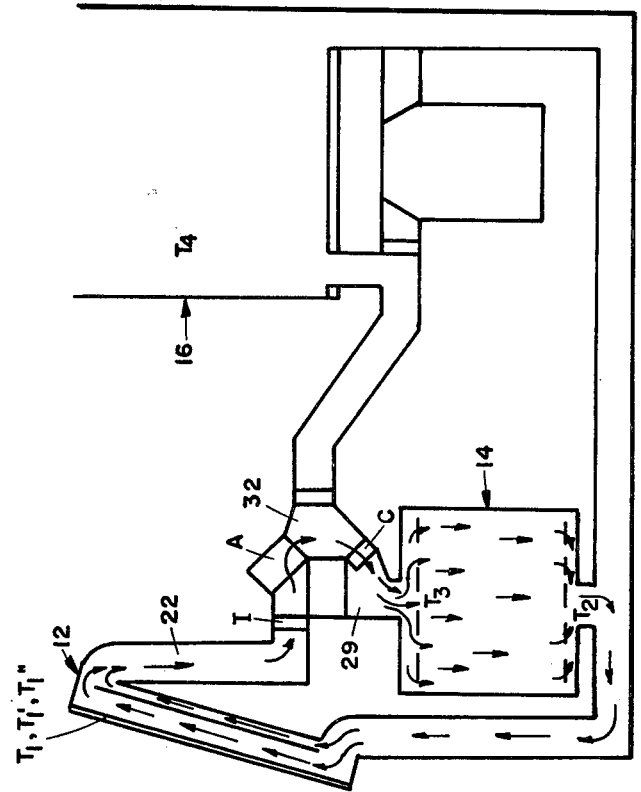
FIG. 4 is a schematic diagram of the system in mode 4, with air flowing from the solar collector to storage.

In mode 4, FIG. 4 and 4a, the space to be heated does not call for heat but the solar collector has sufficient heat to be added to storage for further use. Thus, the temperature sensor T1 senses a temperature greater than the temperature sensed by sensor T2 so that the differential thermostat energizes relay CR1 and, if either motorized damper E or C is open, blower A will have power applied to the high speed windings thereof. The motorized damper C will open, allowing transfer of heated air to the storage from the solar collector. Because the space is not calling for heat, relays CR6A and CR6B are not energized and relay CR4 is in its rest position. The relays in the schematic are in fact all at rest in this mode. Also, in this mode, temperature sensors T1 and T3 are not necessarily satisfied and are shown as such. Back pressure responsive damper I is held open by pressure upstream greater than downstream thereof. (In the schematic, double contacts are shown used for relay CR2, for increased amperage although this is purely optional.)

Thus, in mode 4, air from the collector 12 is circulated through duct 22 and blower A operating at high speed, into chamber 32 and back through motorized damper C to storage unit 14 where it discharges heat by passage through the heat sink, and then is recirculated back through duct portion 28' to the solar collector to again be heated.

Figure 5A:
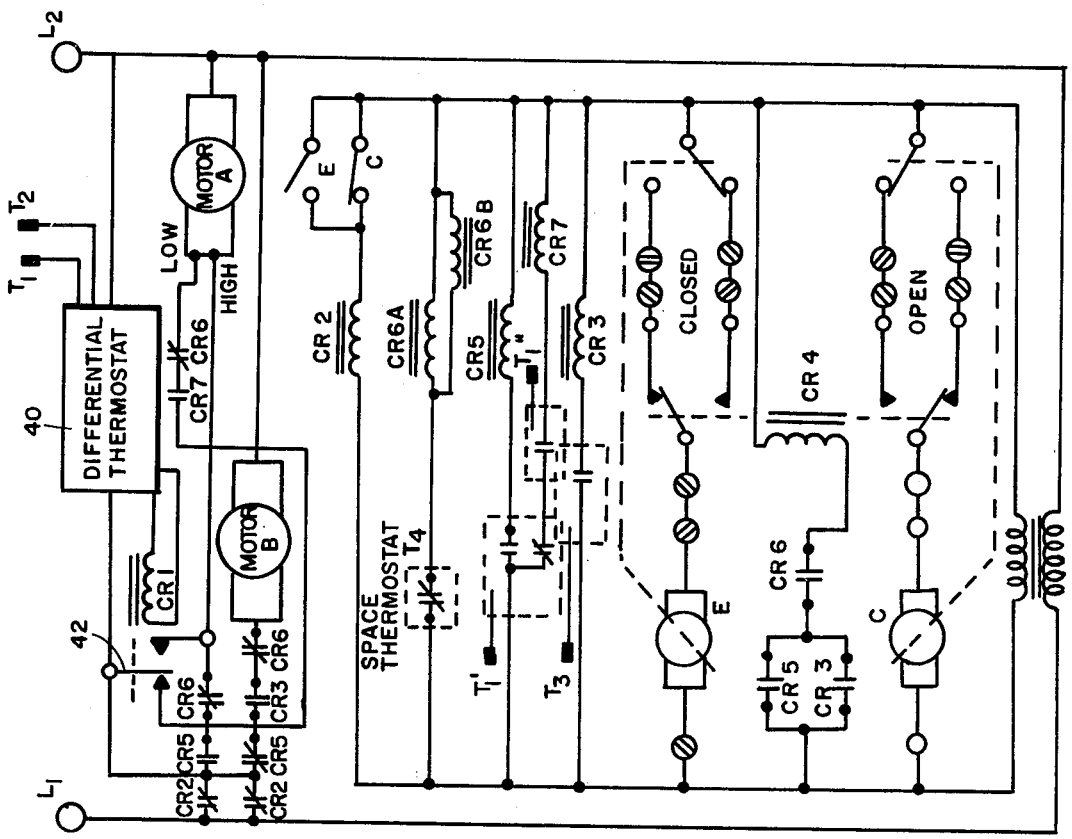
FIG. 5a is an electrical diagram of the control system for mode 5.
Figure 5:
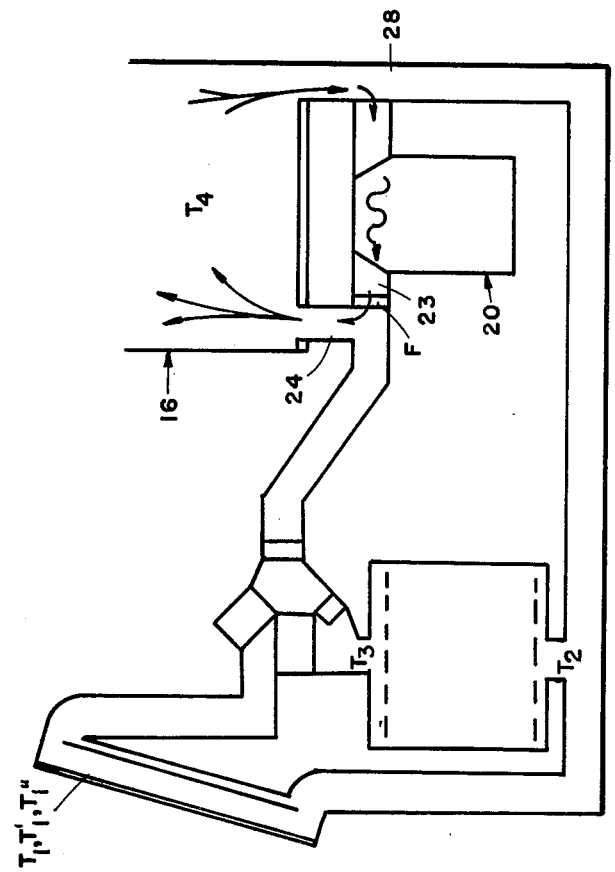
FIG. 5 is a schematic diagram of the system in mode 5, with heat being supplied from the auxiliary heating unit to the space.

Assuming that the solar system is being employed where an auxiliary heating unit 20 is necessary, the illustrative version of the system depicted is shown to include such. Mode 5 (FIG. 5 and FIG. 5a) is set forth to depict supply heat from such a source when there is inadequate heat in the storage unit and in the collector. This optional arrangement need not be employed in some climatic conditions. If such is employed, with the temperature at sensors T1, T1' and T1" in the solar collector equal to or less than the temperature at sensor T2, and sensor T3 not being satisfied, energizing of relays CR6A and CR6B by the space thermostat does not activate the blowers. In such a condition, the space thermostat can energize an additional relay (not shown) to activate the auxiliary heating unit with its own independent air propulsion means. This would open damper F to allow heated air flow directly from the auxiliary unit to the environmental space, and return in recirculatory fashion as depicted in FIG. 5.

It will be readily apparent to those in the art and to those skilled in control circuitry that many variations in the type and arrangement of components, and in the type of circuitry and circuitry components employed, could be made. The particular embodiment shown has the advantage of being readily assembled and operated by those with ordinary training in the field of heating, using standard available components such as relays, motors, dampers, and thermostats that are readily and widely available. The use of solid state circuitry for part or all of the electrical system would enable a more compact arrangement capable of mass production, of course, and might be desirable in some instances. These and other variations are intended to be within the scope of the invention taught.

The embodiments of the invention in which an exclusive property or privilege is claimed are defined as follows:

1. In a forced air solar heating system for an environmental space, including a solar collector and a heat storage unit; an air flow handler and mixer control having a first chamber communicable with said solar collector, a second chamber communicable with said heat storage unit, and a third mixing chamber communicable with said environmental space; a first air propulsion unit for said first chamber, arranged to draw heated air from said solar collector; a second air propulsion unit for said second chamber arranged to draw heated air from said heat storage unit; said first and second air propulsion units being arranged to selectively discharge heated air into said mixing chamber; means for selectively operating said first propulsion unit, said second propulsion unit, or both said propulsion units, and means for selectively controlling flow from said first and second propulsion units, whereby heated air can be alternately supplied to said environmental space from said solar collector by said first propulsion unit, or from said storage unit by said second propulsion unit, or mixed from both said solar collector and said storage unit in said mixing chamber by both said first and said second propulsion units.

2. The solar heating system in claim 1 wherein said means for controlling flow is responsive to temperatures in said solar collector and in said heat storage unit to control the alternate supply of heated air to said environmental space.

3. The solar heating system in claim 2 wherein said means for controlling flow includes valves for the air propelled by said air propulsion units.

4. The solar heating system in claim 2 wherein said first air propulsion unit has more than one air propulsion rate and is responsive to cause a lesser rate of air flow from said first air propulsion unit when heated air is mixed from both said solar collector and said storage unit, and a greater rate of air flow when only from said solar collector.

5. The system in claim 1 wherein said means for controlling includes temperature sensors for said storage unit, said solar collector, and said environmental space and is responsive thereto whereby heated air can be circulated from said solar collector to said storage unit, from said collector to said environmental space, from said storage unit to said environmental space, and from both said collector unit and said storage space to said mixing chamber and then to said environmental space.

* * * * *

UNITED STATES PATENT AND TRADEMARK OFFICE
CERTIFICATE OF CORRECTION

PATENT NO. : 4,203,424

DATED : May 20, 1980

INVENTOR(S) : DeWayne Coxon and Timothy P. Gates

It is certified that error appears in the above-identified patent and that said Letters Patent are hereby corrected as shown below:

In the abstract, line 10:
 "then" should be ---thence---

Column 3, line 10:
 "engery" should be ---energy---

Column 3, line 47:
 "circulate" should be ---circulated---

Column 3, line 58:
 "temparature" should be ---temperature---

Column 4, line 1:
 "thermostates" should be ---thermostats---

Column 5, line 61:
 "further" should be ---future---

Signed and Sealed this

Twenty-third Day of September 1980

[SEAL]

Attest:

SIDNEY A. DIAMOND

Attesting Officer

Commissioner of Patents and Trademarks